No. 822,735. PATENTED JUNE 5, 1906.
J. GRIBBIN.
FLY CATCHER.
APPLICATION FILED JAN. 11, 1906.
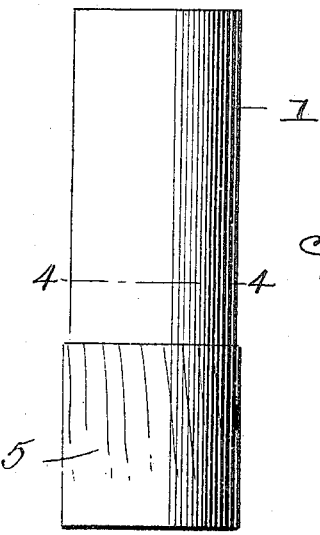
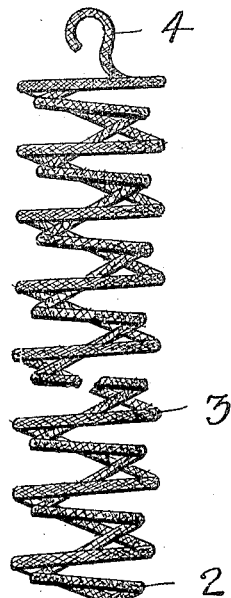
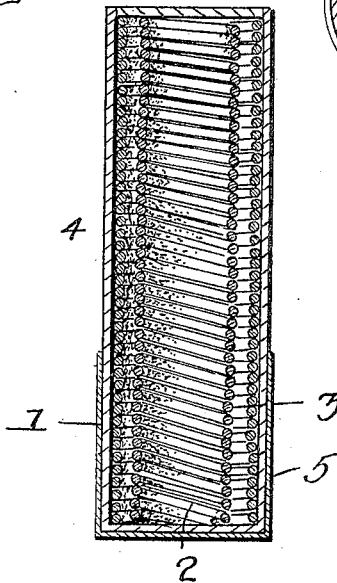
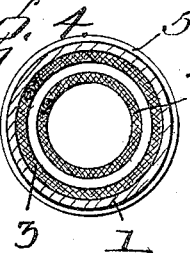
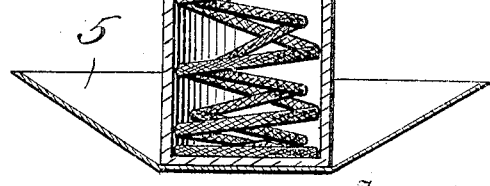
Witnesses
Inventor
James Gribbin.
Attorney

UNITED STATES PATENT OFFICE.

JAMES GRIBBIN, OF FRANKFORD, PENNSYLVANIA.

FLY-CATCHER.

No. 822,735. Specification of Letters Patent. Patented June 5, 1906.

Application filed January 11, 1906. Serial No. 295,645.

*To all whom it may concern:*

Be it known that I, JAMES GRIBBIN, a citizen of the United States, residing at Frankford, in the county of Philadelphia and State of Pennsylvania, have invented certain new and useful Improvements in Fly-Catchers; and I do declare the following to be a full, clear, and exact description of the invention, such as will enable others skilled in the art to which it appertains to make and use the same.

This invention relates to improvements in fly-catchers.

The object of the invention is to provide a device of this character which when arranged in operative position will attract and catch flies and which before being arranged for use may be held in compact form within a cover-case to facilitate the handling and storing of the same.

With the above and other objects in view the invention consists of certain novel features of construction, combination, and arrangement of parts, as will be hereinafter described and claimed.

In the accompanying drawings, Figure 1 is a side view of a fly-catcher constructed in accordance with the invention, showing the same closed. Fig. 2 is a longitudinal vertical sectional view of the same. Fig. 3 is a similar view showing the device open for use, and Fig. 4 is a transverse sectional view on the line 4 4 of Fig. 1.

Referring more particularly to the drawings, 1 denotes a casing which is preferably in the form of a cylindrical box, which may be formed in any convenient size and of any suitable material, the same, however, being preferably formed of stiff paper or pasteboard. Within the casing 1 is arranged inner and outer spiral coils of wire 2 and 3, said wires being coiled in opposite directions, so that when drawn out of the casing or stretched, as shown in Fig. 3, the convolutions of one coil will lie between or across the convolutions of the other coil. On the outer ends of the wires is formed a hook 4, by means of which the device may be suspended from a suitable support.

Secured to the bottom of the casing 1 is a circular disk 5, preferably formed of paper, and which before the device is arranged for use is adapted to be folded up around the box or casing 1, as shown in Figs. 1 and 2, and when the device is in use to be opened out, as shown in Fig. 3, to form a saucer-shaped receptacle by means of which any flies dropping off of the wire coils above will be caught.

When in use the device is drawn out of the casing or stretched so that the convolutions of the coils are separated to a greater or less degree, as desired, and when in this position may be suspended or supported in any suitable manner to attract flies or other insects. Each of the wires 2 and 3 are preferably provided with a fabric covering and are coated with a viscous substance which will securely hold a fly or other insect alighting on the wires.

A fly-catching device of this character constructed as herein shown and described will be found to be much more convenient than the ordinary form of sticky fly-paper and the like at present on the market and will afford a more reliable and attractive trap owing to the known propensity of flies for alighting upon a suspended cord or wire. The compact form into which the device may be arranged before being used renders the same much more readily and conveniently handled by merchants and purchasers.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claim.

Having thus described my invention, what I claim as new, and desire to secure by Letters Patent, is—

In a fly-catcher, the combination with a receptacle or casing provided with a scored tray adapted to be folded up against the casing or extended out to form a tray, of fabric-covered wires, a coating of viscous material on said fabric-covered wires, said wires being arranged one inside the other and coiled in opposite directions, the convulution of one coil being located between those of the other, and a hook formed on the outer end of one of said wires for supporting the device, substantially as described.

In testimony whereof I have hereunto set my hand in presence of two subscribing witnesses.

JAMES GRIBBIN.

Witnesses:
  WILLIAM P. CLAUSEN,
  WM. E. DUDLEY.